United States Patent
Burns

(10) Patent No.: US 8,167,364 B2
(45) Date of Patent: May 1, 2012

(54) ROOF PANEL WITH INSERT

(75) Inventor: Stephen F. Burns, Huntertown, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 442 days.

(21) Appl. No.: 12/508,005

(22) Filed: Jul. 23, 2009

(65) Prior Publication Data

US 2011/0018311 A1    Jan. 27, 2011

(51) Int. Cl.
*B62D 25/06* (2006.01)
(52) U.S. Cl. .................... 296/210; 296/187.01
(58) Field of Classification Search .................. 296/210, 296/193.12, 190.08, 187.01
See application file for complete search history.

(56) References Cited

U.S. PATENT DOCUMENTS

| | | | |
|---|---|---|---|
| 3,904,243 A | 9/1975 | Kostelec et al. | |
| 6,409,258 B1* | 6/2002 | Grimm et al. | 296/216.08 |
| 7,189,450 B2* | 3/2007 | Biewer et al. | 428/304.4 |
| 7,547,061 B2* | 6/2009 | Horimatsu et al. | 296/187.03 |
| 7,735,226 B2* | 6/2010 | Riviere et al. | 29/897.2 |
| 7,942,475 B2* | 5/2011 | Murray | 296/216.07 |
| 2001/0003400 A1* | 6/2001 | Grimm et al. | 296/210 |
| 2002/0021028 A1* | 2/2002 | Grimm | 296/210 |
| 2002/0093225 A1* | 7/2002 | Grimm | 296/210 |
| 2003/0011213 A1* | 1/2003 | Zinsmeister et al. | 296/210 |
| 2003/0122405 A1* | 7/2003 | Stallfort et al. | 296/210 |
| 2004/0075302 A1* | 4/2004 | Chon et al. | 296/210 |
| 2004/0124673 A1* | 7/2004 | Schonebeck | 296/210 |

* cited by examiner

*Primary Examiner* — Jason S Morrow
(74) *Attorney, Agent, or Firm* — Jeffrey P. Calfa; Mark C. Bach; Gerald W. Askew

(57) ABSTRACT

Embodiments disclosed herein provide a vehicle roof having a roof panel formed of molded fiberglass. The panel has a first surface and a second surface. An insert is molded into the roof panel. The insert has an interior surface generally concentrically disposed about an axis that is generally perpendicular to the first surface and the second surface of the roof panel. The insert is at least substantially embedded in the roof panel.

12 Claims, 2 Drawing Sheets

FIG. 1
PRIOR ART
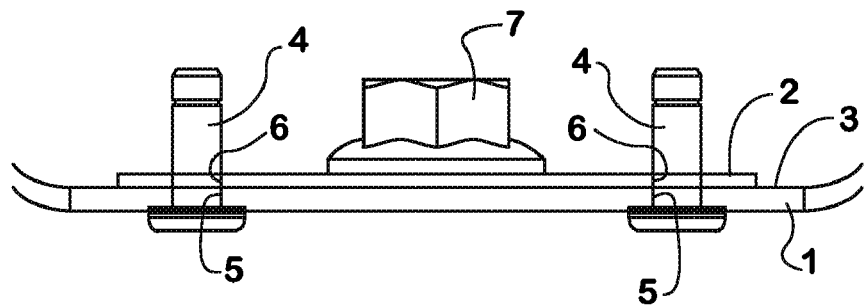
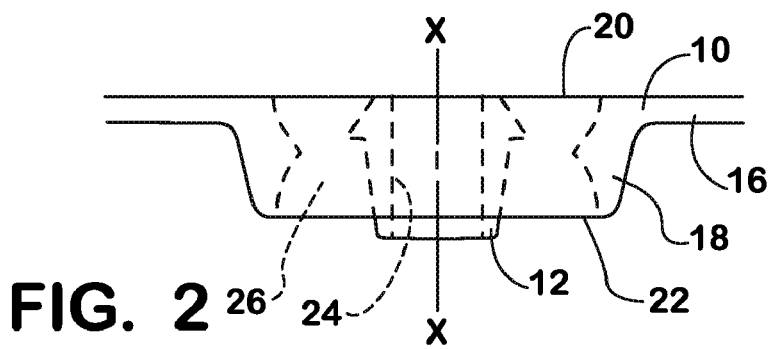
FIG. 2
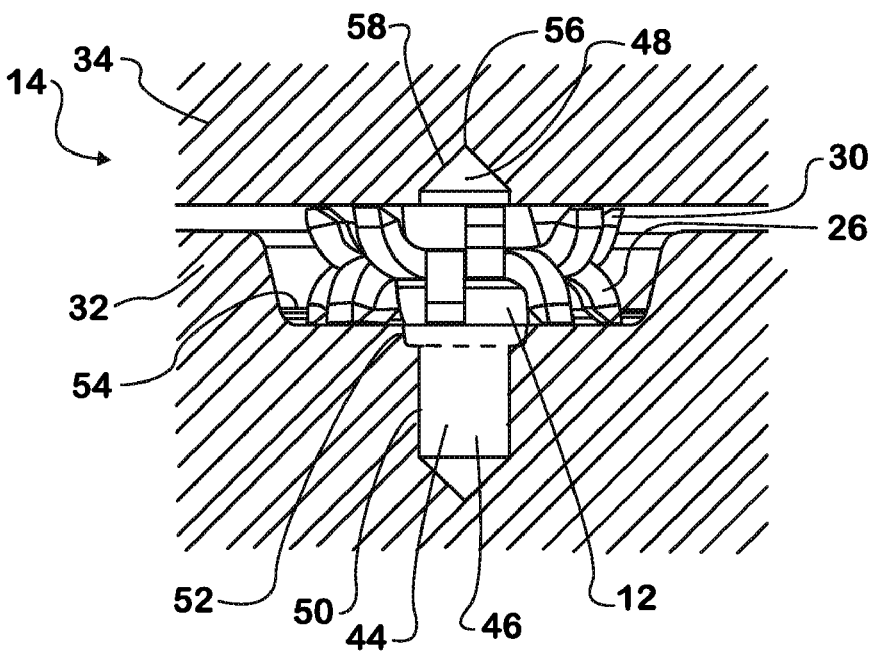
FIG. 3

ROOF PANEL WITH INSERT

FIELD

Embodiments disclosed herein relate generally to motor vehicle assembly and more particularly to assembly of components to panels, such as roof panels, formed by resin transfer molding (RTM).

BACKGROUND

Some vehicle roof panels call for a glass reinforced plastic shell made of one or a plurality of pieces. Vehicles are sometimes provided with a sleeper compartment, which requires the attachment of components to the roof panels. Vehicle parts that are mounted to the roof panel in sleeper compartments may include interior trim panels, HVAC ducting, cabinets, and bunks.

In some constructions, after the roof panel is molded, the roof panel is then drilled to attach a backing plate to the roof panel. The backing plate is mounted to the roof panel with rivets, and once mounted, vehicle components can be attached to the backing plate. Drilling of the roof panel can result in some dimensional variation in the size of the resulting holes and in the placement of the holes in the roof panel. Such dimensional variation can result in misalignment or installation problems with the backing panel.

SUMMARY

According to one embodiment, a vehicle roof having a roof panel formed of molded fiberglass has a first surface and a second surface. An insert is molded into the roof panel. The insert has an interior surface generally concentrically disposed about an axis that is generally perpendicular to the first surface and the second surface of the roof panel. According to another embodiment, a method of forming a fiberglass panel with an embedded insert in a mold having at least a first and a second mold component, the first mold component having a receiving portion, comprises the steps of positioning a removable locator into an interior surface of an insert. The insert has a spacer disposed around the exterior surface of the insert. The locator has a length greater than a length of the insert. A first end of the locator extends from a first side of the interior surface, and a second end of the locator extends from a second side of the interior surface. The first end of the locator is positioned into the receiving portion of the first mold component. Fiberglass is applied between the mold components. The fiberglass is cured between the mold components. The fiberglass panel and embedded insert are removed from the mold. The locator is removed from the insert.

BRIEF DESCRIPTION OF THE DRAWINGS

FIG. 1 is an elevation view of a prior art roof panel with a backing plate mounted to the roof panel.

FIG. 2 is an elevation view of an insert molded into a roof panel.

FIG. 3 is a section view of an insert, a spacer and a locator placed in a mold.

DETAILED DESCRIPTION

Figure 4:
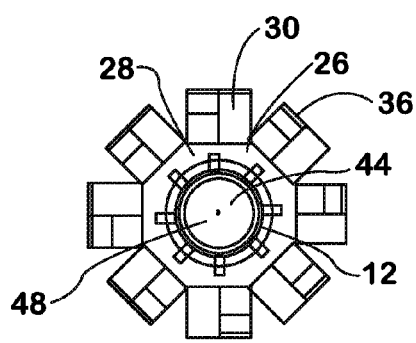
FIG. 4 is a top view of the insert, the spacer and the locator.
Figure 7:
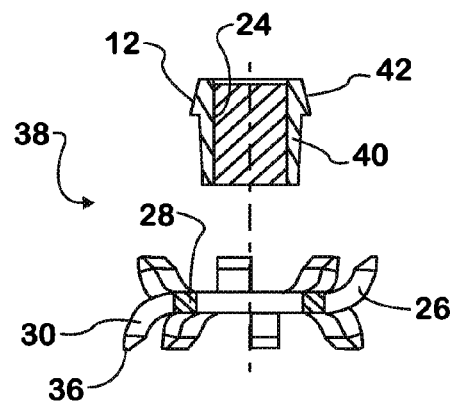
FIG. 7 is an exploded section view of the insert and the spacer.
Figure 5:
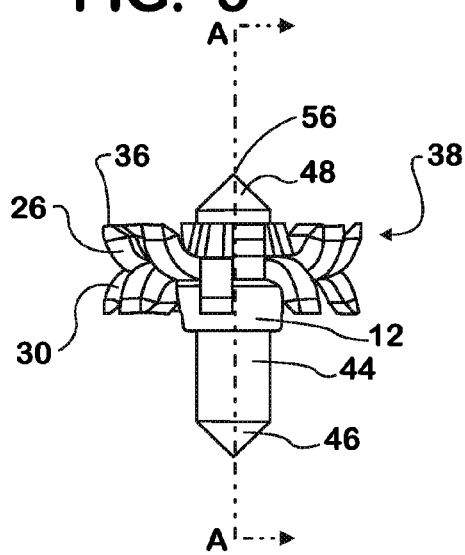
FIG. 5 is an elevation view of the insert disposed within the spacer, and the locator disposed within the insert.
Figure 6:
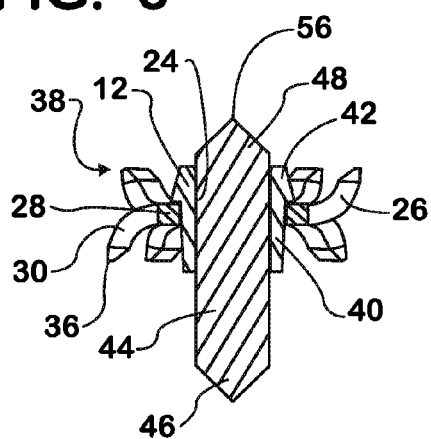
FIG. 6 is a section view of the insert, the spacer and the locator taken along line A-A of FIG. 5.

Referring to FIG. 1, a prior roof panel 1 has a plate 2 mounted to the surface 3 of the roof panel with rivets 4. The rivets 4 are introduced through the roof panel 1 at drilled holes 5, which correspond in dimension and location to the holes 6 in the plate 2. A nut 7 is welded to the plate 2 to allow the mounting of vehicle parts to the plate 2.

Referring now to FIG. 2 and FIG. 3, the present roof panel is designated 10 and has an insert 12 that is molded into the roof panel. In one embodiment, the roof panel 10 is formed of fiberglass and formed in a mold generally designated 14. While the panel 10 is a roof panel of a sleeper compartment of a vehicle, it should be appreciated that the roof panel 10 can be any component formed by resin transfer molding (RTM), including automotive components, such as roofs and hoods, as well as non-automotive components.

A first portion 16 of the roof panel 10 has a thin construction compared to a second portion 18 which has a relatively thicker construction, however the thickness of the portions can vary. The insert 12 is embedded in the second portion 18 of the roof panel 10 and is generally flush with a first surface 20, while on the opposite side of the roof panel, the insert protrudes from a second surface 22. It is also contemplated that the insert projects from both the first surface 20 and the second surface 22, or is generally flush at both the first surface and the second surface, or is generally flush at the second surface and projects from the first surface.

The insert 12 is generally cylindrical and has a cylindrical interior surface 24 concentrically disposed around axis X of the insert 12, which is generally perpendicular to the first surface 20 and the second surface 22. The interior surface 24 is threaded and is configured to receive fasteners (not shown) to secure vehicle parts such as interior trim panels, HVAC ducting, cabinets, and bunks to the roof panel 10. In the illustrated embodiment, the insert 12 is metal, however other materials may be used.

Disposed generally concentrically around the insert 12 is a spacer 26, which is metal in the illustrated embodiment, however other materials may be used. The spacer 26 has a ring 28 (see FIG. 4) and a plurality of fingers 30 that project radially from the ring to space opposing mold components 32, 34 of the mold 14 apart from each other. In some embodiment, the ring 28 is substantially octagonal, however the ring can be circular, polygonal, or any other shape. Disposed on each side of the octagon, there is a set of fingers 30, one of the fingers extending in a first direction generally parallel with the axis X, and one of the fingers extending in the opposite direction also generally parallel with the axis X. In this arrangement, the fingers alternate in direction around the ring 28. It is contemplated that any number of fingers 30 can be disposed around the ring 28 in various arrangements. At the end of each finger 30 is a tapered tip 36.

Referring to FIGS. 4-7, the insert 12 and the spacer 26 are assembled together to form an insert assembly 38. Alternatively, the spacer 26 and insert 12 can be unitarily formed. A shaft 40 of the insert 12 is positioned into the ring 28 of the spacer 26 (see FIG. 6) until a head 42 of the insert 12 contacts the ring (see FIG. 7). The insert 12 and the spacer 26 are welded together, although other methods of permanently fixing the insert and the spacer may be used. A locator 44 is axially disposed in the interior surface 24 of the insert 12 (see FIG. 8) such that a first end 46 of the locator extends substantially more than a second end 48 of the locator. The length of the locator 44 is about two or three times the length of the insert 12 and is formed, in one embodiment, of nylon or any other polymer material that is able to withstand molding temperatures, however other lengths and materials can be used. Additionally, it is contemplated that the exterior surface of the locator 44 can be smooth or threaded, and further, can have indicators to indicate a desired location of the insert 12 relative to the locator.

To form the roof panel 10 with embedded insert 12, the insert assembly 38 is assembled by permanently positioning the insert 12 into the spacer 26 and the locator 44 is positioned into the insert 12. Referring to FIG. 3, mold components 32 and 34 are spaced apart a distance greater than the length of the locator 44. The mold component 32 has a receiving portion 50 being dimensioned to receive the portion of the locator 44 that extends from the first end 46 of the insert 12. An enlarged portion 52 of the receiving portion 50 is configured to receive the first end of the insert 12. When the locator 44 and the insert assembly 32 are placed into the mold component 32, the locator 44 and a first end 46 of the insert are received into the receiving portion 50, and the tips 36 of half of the fingers 30 contact a molding surface 54.

Both cold molding processes and higher temperature molding processes may be used to form the panel 10. In one application of a cold mold process, sheets of fiberglass are placed in the open mold components 32, 34, and then fiberglass resin is poured into the mold components. The mold components 32, 34 are closed, forcing the resin through the fiberglass fabric. Extra pieces of fiberglass fabric may be placed in areas requiring additional thickness, for example around the insert 12. Due to the design of the fingers 30 on the insert 12, the spacer 26 and the insert become woven into the roof panel 10. Some of the layers of fiberglass may be applied over the top of the locator 44.

When the fiberglass layers are in place, the mold components 32 and 34 move towards each other and compress the fiberglass layers. The fingers 30 of the spacer 26 limit the distance that the mold components 32 and 34 can compress. As the components 32 and 34 compress, a pointed end 56 of the locator 44 pierces through any fiberglass layers that are positioned over the top of the locator. The locator 44 is used as an alignment feature in the mold 14 with one point used to help keep the insert centered when placed in the mold and the pointed end 56 used to push through fiberglass fabric. The pointed end 56 is received into a second receiving portion 58 in the mold component 34.

In a higher temperature molding process, such as a sheet molding compound (SMC) process, the mold components 32, 34 are first closed and a mixture of fiberglass strands and a resin are injected into the closed mold 14 and forced into all of the cavities of the mold, including around the insert 12 and the spacer 26. In the higher temperature process, the locator 44 aligns the insert 12 with respect to the mold 14.

In both the cold temperature and higher temperature molding processes, the locator 44 keeps fiberglass or other materials from contaminating the interior surface 24 of the insert 12, keeping any threads on the interior surface clean. After the mold has cured, the roof panel 10 with the embedded insert 12 is removed from the mold components 32, 34. The locator 44 is removed from the interior surface 24 of the insert 12, such as with use of a clamp.

When the locator 44 is removed, the roof panel 10 can be assembled onto a vehicle in a conventional manner. The insert 12 can receive fasteners to mount vehicle components to the roof panel 10.

What is claimed is:

1. A vehicle roof comprising:
    a roof panel formed of molded fiberglass, the roof panel having a first surface and a second surface; and
    an insert molded into the roof panel, the insert having an interior surface generally concentrically disposed about an axis that is generally perpendicular to the first and second surface, the insert being at least substantially embedded in the roof panel, a spacer disposed around the insert;
    wherein the spacer comprises:
    a ring generally concentrically disposed about the insert;
    a plurality of fingers extending from the ring, the extension of at least one of the fingers having a component that is parallel with the axis in a first direction; and at least one of the fingers having a component that is parallel with the axis in a second direction, opposite to the first direction.

2. The vehicle roof of claim 1 wherein the insert is entirely embedded in the roof panel along the axis.

3. The vehicle roof of claim 1 wherein the interior surface of the insert is generally cylindrical and threaded.

4. The vehicle roof of claim 1 wherein the insert has a head and a shaft extending from the head.

5. The vehicle roof of claim 1 wherein the ring comprises a polygonal shape.

6. The vehicle roof of claim 1 wherein the ring comprises an octagon, and the plurality of fingers comprises two fingers on each side of the octagon, wherein one of the two fingers extends in the first direction, and the second of the two fingers extends in the second direction.

7. The vehicle roof of claim 1 wherein the ring engages the insert at a junction of a head and a shaft of the insert.

8. The vehicle roof of claim 1 wherein the ring and the shaft are one of permanently attached and integrally formed.

9. The vehicle roof of claim 1 wherein the spacer and the insert are formed of metal.

10. The vehicle roof of claim 1 wherein the insert projects from at least one of the first surface and the second surface of the roof panel.

11. The vehicle roof of claim 1 wherein the plurality of fingers have a tapered tip.

12. A molded fiberglass panel with an embedded insert, comprising:
    a panel formed of molded fiberglass, the panel having a first surface and a second surface;
    an insert having an axis that is generally perpendicular to the first and second surface, and an interior surface generally concentrically disposed about the axis;
    a spacer disposed generally concentrically about the axis and around the insert, the spacer having a ring and a plurality of fingers extending generally radially from the ring, the extension of at least one of the fingers having a component that is parallel with the axis in a first direction, and at least one of the fingers having a component that is parallel with the axis in a second direction, opposite to the first direction; and
    wherein the insert is at least substantially embedded in the molded fiberglass.

* * * * *